E. V. BARTHMAIER.
LOCK.
APPLICATION FILED NOV. 1, 1915.

1,195,328. Patented Aug. 22, 1916.

Witnesses
Daniel Webster Jr.
C. E. Kleinfelder

Inventor
Eugene V. Barthmaier
By Cyrus N. Anderson
Attorney

UNITED STATES PATENT OFFICE.

EUGENE V. BARTHMAIER, OF NORRISTOWN, PENNSYLVANIA.

LOCK.

1,195,328.  Specification of Letters Patent.  Patented Aug. 22, 1916.

Application filed November 1, 1915.  Serial No. 59,045.

*To all whom it may concern:*

Be it known that I, EUGENE V. BARTHMAIER, a citizen of the United States, and a resident of Norristown, county of Montgomery, State of Pennsylvania, have invented certain new and useful Improvements in Locks, of which the following is a specification.

One of the objects of my invention is to provide a construction of lock, complementary members of which are secured upon the opposing edges of the members to be locked together and which when moved into interlocking relation with respect to each other automatically cause the said opposing edges to register and assume normal positions with respect to each other.

A further object of my invention is to simplify and cheapen lock constructions of the character to which my invention relates and at the same time provide a more efficient and a safer locking mechanism.

A further object of my invention is to provide a construction which is commercially practicable and which will fulfil the purposes for which it is intended in a practical manner.

In order that my invention may be readily understood and its advantages more readily and fully appreciated reference should be had to the accompanying drawings in which I have illustrated one form of a convenient embodiment of the same but it will be understood that said invention is susceptible of embodiment in other forms of construction than that shown within the scope of the claims without departing from my said invention.

Figure 1:
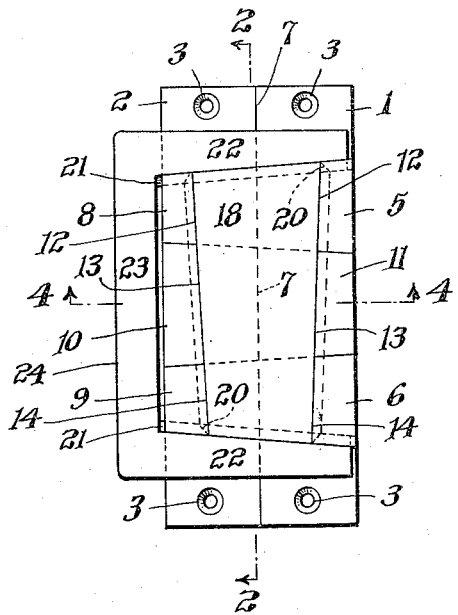
Figure 2:
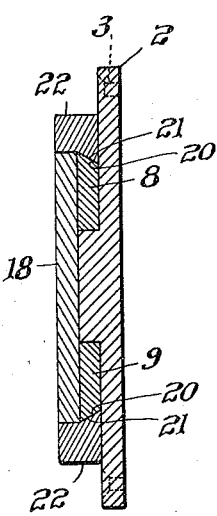
Figure 3:
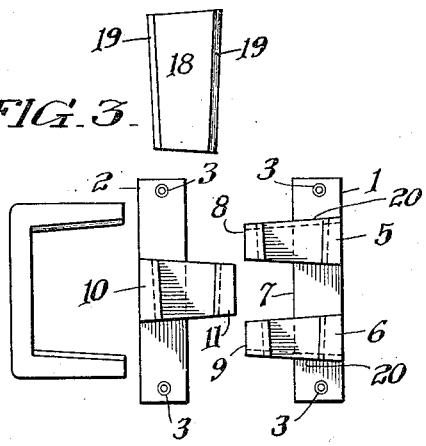
Figure 4:
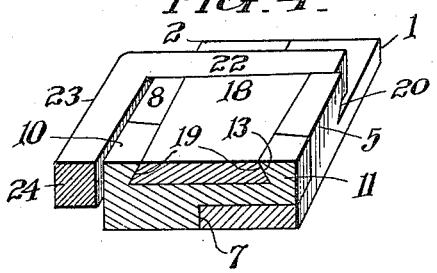

In the drawings: Figure 1 is a top plan view of a lock embodying my invention; Fig. 2 is a longitudinal sectional view taken on the line 2—2 of Fig. 1; Fig. 3 is a top plan view of the several parts of the lock in position ready to be assembled; and Fig. 4 is a transverse sectional view taken on the line 4—4 of Fig. 1.

Referring to the drawings, 1 and 2 designate what may be termed the base members of the lock structure which are adapted to be secured to the opposing edges of any two members, as, for instance, sliding doors, which it is desired to lock together. While these members 1 and 2 are shown as being plane it will be understood that they may be curvilinear should circumstances require. The members 1 and 2 are provided with openings 3 at their opposite ends through which screws or other fastening means may be passed for securing these members to the members (not shown) which are to be locked together by the lock. The member 1 is provided with thickened portions at 5 and 6 upon its front side or face which are extended beyond the inner edge 7 thereof to form projections 8 and 9. These thickened portions 5 and 6 as well as the tongues 8 and 9 are tapered as is shown in Fig. 1 of the drawings. The member 2 is provided with a thickened portion as indicated at 10 which is extended as indicated at 11 to form a projection, said thickened portion and the projection being tapered as indicated in Fig. 1 of the drawings.

In assembling the members 1 and 2 and the interlocking projections 8, 9 and 11 as indicated in Fig. 1, the projection 11 and the thickened portion 10, of which said projection is an extension, extend and are wedged between the opposing edges of the projections 8 and 9 and the thickened portions 5—6 thereof upon the member 1. The interlocking parts 8, 9 and 11 are provided with tapered undercut grooves or notches, as is shown at 12, 13 and 14, which grooves are adapted to aline when the parts of the lock are assembled as shown in Fig. 1 of the drawings to receive a locking key 18 which is provided with beveled edges 19 which are adapted to fit the undercut edges of the grooves or notches 12, 13 and 14. Being wedge-shaped it will be understood that the locking key 18 may be forced into the grooves or notches formed in the several projections 8, 9 and 11 to draw the same together so as to cause the opposing edges of the base members 1 and 2 of the lock to contact with or occupy positions in adjacent relation to each other.

It will be observed that the outer edges of the projections 8—9 and the thickened portions 5 and 6 of which they form extensions are also tapered or inclined. It will be further observed that these outer edges are provided with undercut grooves as indicated at 20. These grooves are adapted to receive the beveled edges 21 formed upon the inner edges of the opposing legs 22 of the yoke-shaped members 23. The legs 22 of this yoke-shaped member are flared and are connected together by means of the cross-piece 24. By reason of the tapering of the outer edges of the parts 8 and 9 and of the flaring of the inner edges of the opposite sides of the yoke-shaped member 23 the latter may be wedged upon the said opposite edges and by reason of the friction between the engaging surfaces held in position and prevented from accidentally becoming disconnected or disengaged from the edges of the said parts 8 and 9. The presence of the yoke member 23 is adapted to prevent removal of the locking key 18 except by some one by whom it should be removed.

I claim:—

1. In a lock, in combination, two members having their adjacent edges in substantially parallel relation and in close proximity to each other and said members having projections extending in opposite directions from said edges, said projections being interlocked and in contact with each other when the said members are in operative relation with respect to each other, the said projections having openings extending transversely thereof and a key for engaging the said openings for holding the said projections in locked relation to each other.

2. In a lock, in combination, base members one of which is provided with two tapered projections extending in the same direction therefrom and the other one of which is provided with a tapered projection which projects into the space between the first-mentioned projections when the said members are placed in operative relation with respect to each other and the said projections each being provided with tapered grooves extending transversely thereof which are adapted to register when the said base members are in opposite relation to each other and a locking key adapted to fit within the said grooves and hold the said projections and the said members in locked relation with respect to each other.

3. In a lock, in combination, two members adapted to be secured together with opposing edges in adjacent relation to each other, one of said members having tapered projections extending from its inner edge, which projections are separated from each other and said member being provided with a transversely extending tapered notch the edges of which constitute continuations of the opposing edges of said projections, and the other of said members having a projection situated laterally of its plane and adapted to extend between the first-named projections and into said notch when the said members are placed in position with their edges in adjacent relation to each other, the projections from each member at such time overlying the other member and a locking key for engaging said projections to hold the same in interlocked relation.

4. In a lock, in combination, two members having their adjacent opposing edges in parallel relation to each other, said members having tapered projections extending in opposite directions from said opposing edges and each of said members having thickened tapered portions in alinement with said projections, the projections of one member overlying the other member when the said projections are interlocked, and means for holding the said projections in interlocked relation.

5. In a lock, in combination, two members having their adjacent opposing edges in parallel relation to each other, said members having tapered projections extending in opposite directions from said opposing edges and each of said members having thickened tapered portions in alinement with said projections, the projections of one member overlying the other member when the said projections are interlocked, the said projections each having a tapered undercut notch which notches are adapted to register when said notches are in interlocked relation, and projections are in interlocked relation, and a key in engagement with said notches for holding the said projections in interlocked relation.

6. In a lock, in combination, two members having their adjacent opposing edges in parallel relation with each other, said members having tapered projections extending in opposite directions from said opposing edges and each of said members having thickened tapered portions in alinement with said projections, the projections of one member overlying the other member when the said projections are interlocked, a key in engagement with said notches for holding the said projections in interlocked relation, and a retaining device in engagement with the outermost edges of the outermost interlocked projections.

7. In a lock, in combination, two base members having their adjacent opposing edges in parallel relation to each other, one of said members having two tapered projections extending from its opposing edge and said member having thickened tapered portions in alinement with said projections, the said projections and the said thickened portions being separated from each other and the other one of said members having a tapered projection extending from its opposing edge and said other member having a thickened tapered portion in alinement with said projection which said projection is adapted to extend into the tapered space between the two projections first mentioned and each of the said projections having an undercut notch extending transversely thereof, a key having edges adapted to engage the undercut edges of said notches which key holds the said projections in interlocked relation with the opposing edges of said members in adjacent relation to each other and a U-shaped member having its opposite sides flared the inner edges of which sides are in engagement with the outer edges of the two first-named projections, substantially as described.

In testimony that I claim the foregoing as my invention, I have hereunto signed my name this 30th day of October, A. D. 1915.

EUGENE V. BARTHMAIER.

In the presence of—
CYRUS N. ANDERSON,
DOROTHY CHERTAH.

Copies of this patent may be obtained for five cents each, by addressing the "Commissioner of Patents, Washington, D. C."